United States Patent
Park

(10) Patent No.: US 8,478,502 B2
(45) Date of Patent: Jul. 2, 2013

(54) SYSTEM AND METHOD FOR CONTROLLING A MOTOR OF A HYBRID VEHICLE

(75) Inventor: Joonyoung Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 164 days.

(21) Appl. No.: 12/959,708

(22) Filed: Dec. 3, 2010

(65) Prior Publication Data
US 2012/0083949 A1 Apr. 5, 2012

(30) Foreign Application Priority Data
Sep. 30, 2010 (KR) .................. 10-2010-0095560

(51) Int. Cl.
  *G06F 19/00* (2006.01)
  *G06G 7/70* (2006.01)
(52) U.S. Cl.
  USPC ............... 701/99; 701/22; 903/902; 903/930; 180/65.21; 180/65.265; 180/65.275; 180/65.285
(58) Field of Classification Search
  USPC ............. 701/22, 99, 101, 102, 110; 180/65.1, 180/65.21, 65.22, 65.225, 65.23, 65.245, 180/65.25, 65.26, 65.275, 65.28, 65.285, 180/65.29; 903/902, 903, 904, 906, 907, 903/915, 930; 318/580, 671, 34, 51, 139, 318/798, 806, 432, 433, 434
  See application file for complete search history.

(56) References Cited

U.S. PATENT DOCUMENTS

| | | | |
|---|---|---|---|
| 7,668,630 B2 * | 2/2010 | Weber et al. | ..................... 701/22 |
| 8,087,484 B2 * | 1/2012 | Seel et al. | ................ 180/65.265 |
| 8,169,173 B2 * | 5/2012 | Doerr et al. | .................... 318/432 |
| 2008/0254940 A1 * | 10/2008 | Stoffels et al. | ................ 477/107 |
| 2009/0211826 A1 * | 8/2009 | Hashimoto | ............. 180/65.275 |
| 2010/0018788 A1 * | 1/2010 | Katsuta et al. | ........... 180/65.225 |

FOREIGN PATENT DOCUMENTS

| | | |
|---|---|---|
| JP | 2008-126895 A | 6/2008 |
| KR | 10-2006-0010970 A | 2/2006 |

* cited by examiner

*Primary Examiner* — Thomas H. Tarcza
*Assistant Examiner* — Rami Khatib
(74) *Attorney, Agent, or Firm* — Edwards Wildman Palmer LLP; Peter F. Corless

(57) ABSTRACT

The invention provides a method for controlling the motor of a hybrid vehicle comprising the steps of detecting states of a plurality of motors and planetary gear sets; deciding total demand torque of the motors in a case that the plurality of motors operates under a predetermined condition; determining whether the total demand torque of the motors is smaller than a sum of continuous rated torque of each motor; deciding torque of each motor by using a torque distribution map according to rotation speed of each motor and the total demand torque in a case that the total demand torque of the motors is smaller than the sum of continuous rated torque of each motor; and controlling each motor based on the decided torque of each motor.

7 Claims, 2 Drawing Sheets

SYSTEM AND METHOD FOR CONTROLLING A MOTOR OF A HYBRID VEHICLE

CROSS-REFERENCE TO RELATED APPLICATION

This application claims priority to and the benefit of Korean Patent Application No. 10-2010-0095560, filed on Sep. 30, 2010, the entire contents of which are incorporated herein by reference.

BACKGROUND OF THE INVENTION (a) Field of the Invention

The present invention relates to a hybrid vehicle. More particularly, the present invention relates to a system and a method for controlling motors of a hybrid vehicle that controls the torque of each motor efficiently and stably by distributing total demand torque to a plurality of motors efficiently, when the plurality of motors provided in the hybrid vehicle operates under a predetermined condition.

(b) Description of the Related Art

A hybrid vehicle uses one or both of an engine such as a gasoline engine or a diesel engine and an electric motor operated by a battery power source.

The hybrid vehicle achieves various drive modes so as to improve fuel economy or power performance by using at least two motors and a coupling means such as a clutch.

For example, the hybrid vehicle achieves an engine mode at which only the engine is operated, an EV mode at which the engine is stopped and only the motor is operated because engine efficiency is low (drive with a low speed), and a HEV mode torque of the motor assists torque of the engine (high load region).

Drive region of the motor is divided into a region where torque is smaller than continuous rated torque and another region where the torque is higher than or equal to the continuous rated torque and is smaller than or equal to a maximum torque. Each drive region of the motor is set considering heat generation of the motor when operating and the capacity of a cooling system.

If the motor is operated at the region where the torque is smaller than the continuous rated torque, cooling capacity exceeds the heat generation and the motor can operate continuously without an increase in motor temperature. On the contrary, if the motor is operated at the other region where the torque is larger than or equal to the continuous rated torque, the heat generation exceeds the cooling capacity and the motor temperature rises. Therefore, the motor cannot operate continuously.

In addition, efficiency characteristics of the motor changes according to a drive point decided based on the torque and the rotation speed thereof.

SUMMARY OF THE INVENTION

The present invention provides a system and a method for controlling motors of a hybrid vehicle, having the advantage of controlling torque of each motor efficiently and stably by distributing total demand torque to a plurality of motors efficiently when the plurality of motors provided in the hybrid vehicle operates under a predetermined condition.

In one embodiment, the system and method of the present invention is applied to a hybrid vehicle using an engine and a plurality of motors as power source.

In one aspect, the invention provides a system for controlling motors of a hybrid vehicle comprising an engine and a plurality of motors as a power source, the system comprising a controller that decides torque of each motor by comparing total demand torque of the motors with a sum of continuous rated torque of each motor wherein the plurality of motors operates under a predetermined condition.

In one embodiment, the controller decides the torque of each motor by using a torque distribution map, wherein the torque distribution map is determined by rotation speed of each motor and a total demand torque wherein the total demand torque of the motors is smaller than a sum of continuous rated torque of each motor.

In another embodiment, the controller decides the torque of each motor by adding a continuous rated torque of each motor and distribution torque of each motor obtained by distributing a difference between the total demand torque and the sum of continuous rated torque according to a capacity of each motor, wherein the total demand torque of the motors is larger than or equal to the sum of continuous rated torque of each motor.

In another embodiment, the controller decides torque of a I-th motor by an equation wherein torque of the I-th motor=continuous rated torque of the I-th motor+difference between the total demand torque and the sum of continuous rated torque×distribution ratio of the I-th motor.

In another aspect, the invention provides a method for controlling motor of a hybrid vehicle comprising: detecting states of a plurality of motors and planetary gear sets; deciding total demand torque of the motors wherein the plurality of motors operates under a predetermined condition; determining whether the total demand torque of the motors is smaller than a sum of continuous rated torque of each motor; deciding torque of each motor by using a torque distribution map wherein the torque distribution map is determined by rotation speed of each motor and a total demand torque wherein the total demand torque of the motors is smaller than the sum of continuous rated torque of each motor; and controlling each motor based on the decided torque of each motor.

In certain embodiments, the method may further include a step of deciding the torque of each motor by adding the continuous rated torque of each motor and distribution torque of each motor obtained by distributing a difference between the total demand torque and the sum of continuous rated torque according to a capacity of each motor wherein the total demand torque of the motors is larger than or equal to the sum of continuous rated torque of each motor.

In another embodiment, the invention provides a method wherein the distribution torque of each motor may be calculated by multiplying a distribution ratio of each motor to the difference between the total demand torque and the sum of continuous rated torque.

In another embodiment, the invention provides a method wherein the total demand torque of the motors may be decided based on drive demand torque, vehicle speed, and state of charge (SOC) of a battery.

Figure 1:
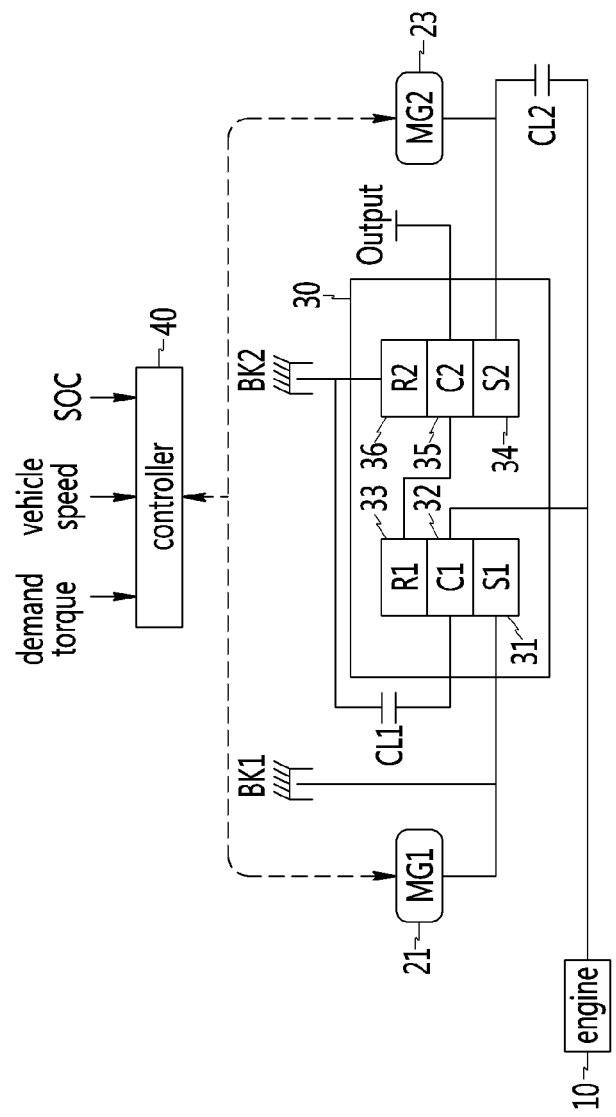
FIG. 1 is a schematic diagram showing a power train of a hybrid vehicle according to an embodiment of the present invention.

| Description of symbols> | |
|---|---|
| 10: engine | 21, 23: the first and second motors |
| 30: planetary gear set | 40: controller |

DETAILED DESCRIPTION OF THE EMBODIMENTS

Hereinafter, referring to the drawings, exemplary embodiments of the present invention will be described in detail.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

FIG. 1 is a schematic diagram showing a power train of a hybrid vehicle according to an embodiment of the present invention.

Referring to FIG. 1, the hybrid vehicle includes an engine 10 and first and second motors 21 and 23 as a power source, a planetary gear set 30, first and second clutches CL1 and CL2, first and second brakes BK1 and BK2, and a controller 40. The planetary gear set 30 includes first and second sun gears S1 and S2, first and second carriers C1 and C2, and first and second ring gears R1 and R2.

Output of the engine 10 is directly transmitted to the first carrier 32 of the planetary gear set 30 constituting a transmission, and is selectively transmitted to the second motor 23 and the second sun gear 43 through the second clutch CL2.

A sum of torques of the engine 10 and the second motor 23 or torque of the second motor 23 may be an input of the second sun gear 43 according to an operation of the second clutch CL2.

The first motor 21 is connected to the first brake BK1 and the first sun gear 31, and operates as a generator so as to recharge a battery (not shown) when regenerative braking.

The second motor 23 operates as the generator so as to recharge the battery when the output of the engine 10 input through the second clutch CL2 is sufficient.

The first ring gear 33 of the planetary gear set 30 is connected to the second carrier 35, which is connected to an output shaft of the transmission, and the second ring gear 36 is connected to the second brake BK2 and is connected to the first carrier 32 through the first clutch CL1.

The controller 40 decides the torque of each motor considering the capacities of the first motor 21 and the second motor 23.

The controller 40 compares the total demand torque of the first and second motors 21 and 23, with the sum of continuous rated torque of each motor, and decides the torque of each motor by using a distribution map or by distributing the total demand torque considering the capacity of each motor.

Figure 2:
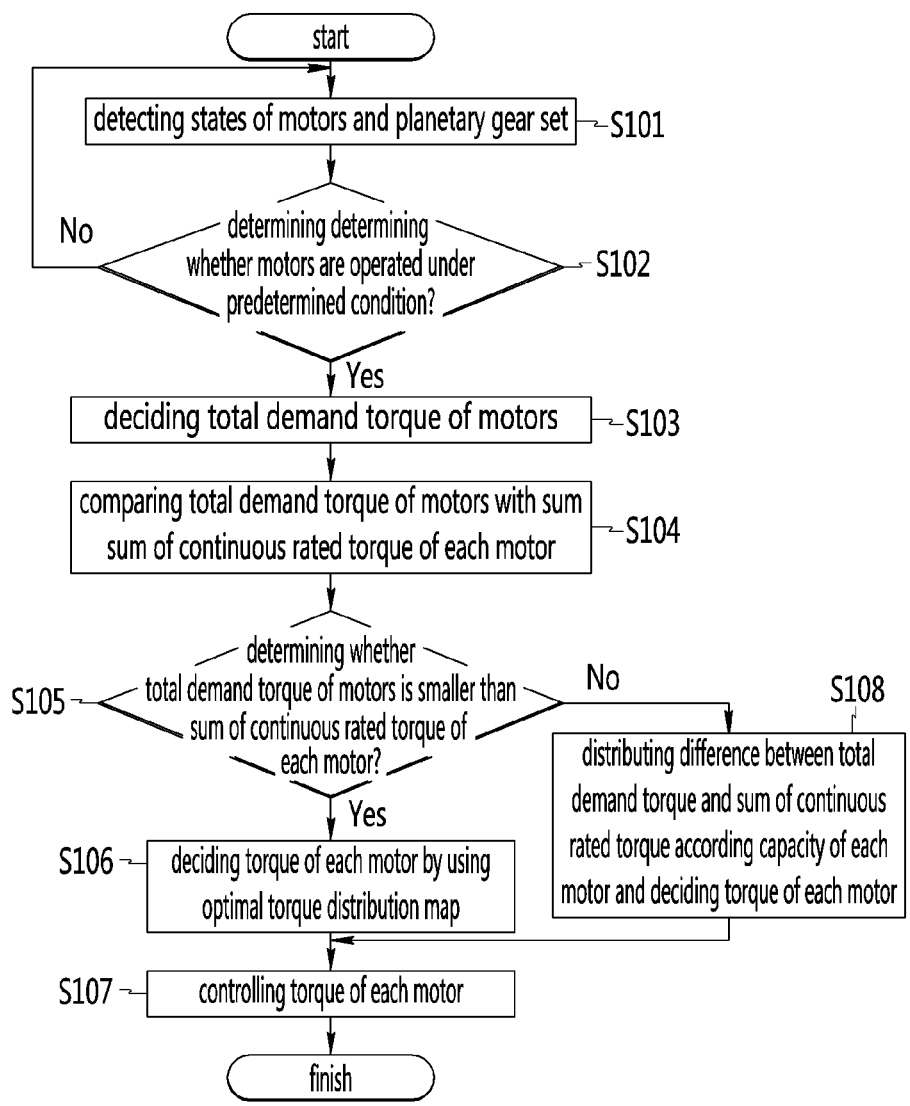
FIG. 2 is flowchart of a method for controlling motor of a hybrid vehicle according to an embodiment of the present invention.

Referring to FIG. 2, a method for controlling motors of a hybrid vehicle according to an embodiment of the present invention will be described in detail.

FIG. 2 is flowchart of a method for controlling the motor of a hybrid vehicle according to an embodiment of the present invention.

In a state that the hybrid vehicle runs, the controller 40 detects states of the first and second motors 21 and 23, and a state of the planetary gear set 30 at a step S101, and determines whether the first and second motors 21 and 23 are operated under a predetermined condition at a step S102.

The predetermined condition may be satisfied when a current driving state is an under drive state in which the second clutch CL2 and the second brake BK2 are operated, or a 1:1 shift ratio state in which the first clutch CL1 and the second clutch CL2 are operated. Or, the predetermined condition may be satisfied when a plurality of motors is simultaneously operated. Particularly, the predetermined condition may be satisfied when rotation speeds of the plurality of motors are limited to a specific gear ratio.

If the predetermined condition is not satisfied at the step S102, the controller 40 returns to the step S101.

However, if the predetermined condition is satisfied at the step S102, the controller 40 decides the total demand torque that the first and second motors 21 and 23 should output by considering the capacities of the first and second motors 21 and 23 and assist torque or regeneration torque of the first and second motors 21 and 23 at a step S103.

The total demand torque of the first and second motors 21 and 23 is decided considering a drive demand torque, a vehicle speed, and/or a state of charge (SOC) of the battery.

If the total demand torque that the first and second motors 21 and 23 should output at the step S103, the controller 40 compares the total demand torque of the first and second motors 21 and 23 with the sum of continuous rated torques of the first and second motors 21 and 23 at a step S104, and determines whether the total demand torque of the first and second motors 21 and 23 is smaller than the sum of continuous rated torques of the first and second motors 21 and 23 at a step S105.

If the total demand torque of the first and second motors 21 and 23 is smaller than the sum of continuous rated torques of the first and second motors 21 and 23 at the step S105, the controller 40 decides the torques of the first and second motors 21 and 23 by using an optimal torque distribution map which can maximize performance efficiencies of the first and second motors 21 and 23 at a step S106.

The torques of the first and second motor 21 and 23 may be decided by using the optimal torque distribution map according to a rotation speed of each motor and the total demand torque of the motors.

The optimal torque distribution map can be obtained through optimizing processes as follows.

$$\text{Max(Motor operating efficiency)} = \text{Max(Mechanical Power/Electrical Discharge Power)}$$

$$= \text{Max}\left(\sum (\omega_{motor\_i} \times T_{motor\_i}) / \left(\sum P_{motor\_electrical\_i}\right)\right)$$

(in a case of discharge)

$$= \text{Max(Electrical Charge Power/Mechanical Power)}$$

$$= \text{Max}\left(\sum P_{motor\_electrical\_i} / \sum (\omega_{motor\_i} \times T_{motor\_i})\right)$$

(in a case of charge)

Herein, $T_{motor\_i}$ (i=1-N)

$T^*_{motor} = \Sigma T_{motor\_i}$ (Total Demand Torque of Motors)

$\omega_{motor} = k_1 \omega_{motor\_1} = \ldots = k_N \omega_{motor\_N}$ (gear ratio of each motor should be maintained constant, $k_i > 0$)

$T_{motor\_i} < T_{motor\_conti\_i}$ (torque of each motor should be decided within continuous rated torque)

That is, all the possible sets of the motor speed $\omega_{motor}$ and the total demand torque of the motors $\Sigma T_{motor\_i}$ is optimized to obtain an optimal map.

If the torques of the first and second motors 21 and 23 are decided by using the optimal torque distribution map at the step S106, the controller 40 controls voltages applied to the first motor 21 and the second motor 23 through a power controller (not shown) so as to control output torque of each motor at a step S107.

However, if the total demand torque of the first and second motors 21 and 23 is larger than or equal to the sum of the continuous rated torque of the first and second motors 21 and 23 at the step S105, the controller 40 decides the torques of the first and second motors 21 and 23. In further detail, the controller 40 calculates a difference between the total demand torque of the first and second motors 21 and 23 and the sum of the continuous rated torque of the first and second motors 21 and 23, and decides the torques of the first and second motors 21 and 23 by adding a distribution torque of each motor obtained by distributing the difference according to the capacities of the first and second motors 21 and 23, to the continuous rated torque of each motor at a step S108.

The torque of each motor is decided as follows.

$$T_{motor\_i}=T_{motor\_conti\_i}+(T^*_{motor}-\tau T_{motor\_conti\_i})\times(T_{motor\_max\_i}-T_{motor\_conti\_i})/\Sigma(T_{motor\_max\_i}-T_{motor\_conti\_i})$$

That is, the torque of the I-th motor=continuous rated torque of the I-th motor+difference between the total demand torque and the sum of continuous rated torque×distribution ratio of the I-th motor After that, the controller 40 controls voltages applied to the first motor 21 and the second motor 23 through a power controller (not shown) so as to control output torque of each motor at the step S107.

As described above, since the total demand torque of the motors is evenly distributed according to the heat capacity of each motor in the hybrid vehicle, the motors are not overheated according to the present invention. Therefore, the system stability is improved.

The distribution ratio $((T_{motor\_max\_i}-T_{motor\_conti\_i})/\Sigma(T_{motor\_max\_i}-T_{motor\_conti\_i}))$ of the motor presented by an embodiment of the present invention may be applied to a case where heat-characteristics of each motor is linear. The distribution ratio may be weighted according to the heat-characteristics of each motor.

According to an embodiment of the present invention, since a plurality of motors in a hybrid vehicle can be operated efficiently and the torque of each motor can be controlled stably, fuel economy and stability of the motor are improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for controlling motors of a hybrid vehicle comprising a power source including an engine and a plurality of motors as a power source, the system comprising:
   a controller configured to determine a torque of each motor by comparing a total demand torque of the motors with a sum of continuous rated torque of each motor by using a torque distribution map when the total demand torque of the motors is less than a sum of continuous rated torque of each motor, wherein the torque distribution map is determined via a rotation speed of each motor and total demand torque of the plurality of motors, and
   the plurality of motors are controlled based on the determined torque of each motor.

2. A system for controlling motors of a hybrid vehicle comprising a power source including an engine and a plurality of motors as a power source, the system comprising:
   a controller configured to determine a torque of each motor by comparing a total demand torque of the motors with a sum of continuous rated torque of each motor by adding a continuous rated torque of each motor and distribution torque of each motor obtained by distributing a difference between the total demand torque and the sum of continuous rated torque according to a capacity of each motor, when the total demand torque of the motors is greater than or equal to the sum of continuous rated torque of each motor, and
   the plurality of motors are controlled based on the determined torque of each motor.

3. The system of claim 2, wherein the controller determines torque of an I-th motor by an equation wherein, the torque of I-th motor=continuous rated torque of I-th motor+difference between the total demand torque and the sum of continuous rated torque× distribution ratio of I-th motor.

4. A method for controlling motors of a hybrid vehicle, comprising:
   detecting, by a controller, states of a plurality of motors and planetary gear sets;
   determining, by the controller, total demand torque of the motors wherein the plurality of motors operates under a predetermined condition;
   determining, by the controller, whether the total demand torque of the motors is smaller than a sum of continuous rated torque of each motor;
   determining, by the controller, torque of each motor by using a torque distribution map, when the total demand torque of the motors is less than the sum of continuous rated torque of each motor, wherein the torque distribution map is determined by rotation speed of each motor and a total demand torque; and
   controlling, by the controller, each motor based on the determined torque of each motor.

5. The method of claim 4, further comprising:
   determining, by the controller, the torque of each motor by adding the continuous rated torque of each motor and distribution torque of each motor obtained by distributing a difference between the total demand torque and the sum of continuous rated torque according to a capacity of each motor when the total demand torque of the motors is larger than or equal to the sum of continuous rated torque of each motor.

6. The method of claim 5, wherein the distribution torque of each motor is calculated by multiplying a distribution ratio of each motor to the difference between the total demand torque and the sum of continuous rated torque.

7. The method of claim 4, wherein the total demand torque of the motors is determined based on drive demand torque, vehicle speed, and state of charge (SOC) of a battery.

* * * * *